(12) United States Patent
Henry et al.

(10) Patent No.: US 11,668,022 B2
(45) Date of Patent: Jun. 6, 2023

(54) APPARATUS FOR PROCESSING OILSEED FLAX FIBER FOR USE IN BIOCOMPOSITE MATERIALS

(71) Applicant: CNH Industrial Canada, Ltd., Saskatoon (CA)

(72) Inventors: James Henry, Saskatoon (CA); Satyanarayan Panigrahi, Saskatoon (CA); Radhey Lal Kushwaha, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 1180 days.

(21) Appl. No.: 15/701,850

(22) Filed: Sep. 12, 2017

(65) Prior Publication Data

US 2018/0000307 A1    Jan. 4, 2018

Related U.S. Application Data

(60) Division of application No. 14/530,242, filed on Oct. 31, 2014, now abandoned, which is a
(Continued)

(51) Int. Cl.
*D01B 1/00* (2006.01)
*D01G 21/00* (2006.01)
(Continued)

(52) U.S. Cl.
CPC .................. *D01B 1/00* (2013.01); *C08J 5/06* (2013.01); *C08L 97/02* (2013.01); *D01B 1/12* (2013.01);
(Continued)

(58) Field of Classification Search
CPC ... D01B 1/00; D01B 1/12; D01C 1/02; D01G 9/08; D01G 15/02; D01G 19/06; D01G 21/00
See application file for complete search history.

(56) References Cited

U.S. PATENT DOCUMENTS 1,733,256 A * 10/1929 Gardner .................. D01B 1/04
19/66 R
2,721,358 A    10/1955 Litvan
(Continued)

OTHER PUBLICATIONS

PCT/IB2015/000228, International Search Report and Written Opinion dated Jun. 10, 2015, 12 pages.
(Continued)

*Primary Examiner* — Shaun R Hurley
(74) *Attorney, Agent, or Firm* — Rebecca Henkel; Rickard DeMille

(57) ABSTRACT

A method and system for the production of fibers for use in biocomposites is provided that includes the ability to use both retted and unretted straw, that keeps the molecular structure of the fibers intact by subjecting the fibers to minimal stress, that maximizes the fiber's aspect ratio, that maximizes the strength of the fibers, and that minimizes time and energy inputs, along with maintaining the fibers in good condition for bonding to the polymer(s) used with the fibers to form the biocomposite material. This consequently increases the functionality of the biocomposites produced (i.e. reinforcement, sound absorption, light weight, heat capacity, etc.), increasing their marketability. Additionally, as the disclosed method does not damage the fibers, oilseed flax straw, as well as all types of fibrous materials (i.e. fiber flax, banana, jute, industrial hemp, sisal, coir) etc., can be processed in bio composite materials.

16 Claims, 5 Drawing Sheets

Related U.S. Application Data continuation-in-part of application No. 14/087,326, filed on Nov. 22, 2013, now Pat. No. 9,650,728.

(60) Provisional application No. 61/943,740, filed on Feb. 24, 2014, provisional application No. 61/948,863, filed on Mar. 6, 2014, provisional application No. 61/955,429, filed on Mar. 19, 2014.

(51) Int. Cl.

| | | |
|---|---|---|
| *C08J 5/06* | (2006.01) | |
| *D01G 9/08* | (2006.01) | |
| *D06B 3/02* | (2006.01) | |
| *D01G 15/02* | (2006.01) | |
| *D01G 19/06* | (2006.01) | |
| *C08L 97/02* | (2006.01) | |
| *D01C 1/02* | (2006.01) | |
| *D01B 1/12* | (2006.01) | |
| *A47L 13/12* | (2006.01) | |
| *A47L 13/16* | (2006.01) | |
| *A47L 17/00* | (2006.01) | |

(52) U.S. Cl.
CPC ............... *D01C 1/02* (2013.01); *D01G 9/08* (2013.01); *D01G 15/02* (2013.01); *D01G 19/06* (2013.01); *D01G 21/00* (2013.01); *D06B 3/02* (2013.01); *A47L 13/12* (2013.01); *A47L 13/16* (2013.01); *A47L 17/00* (2013.01); *C08J 2300/22* (2013.01); *C08J 2323/06* (2013.01); *C08J 2325/06* (2013.01); *C08J 2401/02* (2013.01); *Y10T 428/249921* (2015.04)

(56) References Cited

U.S. PATENT DOCUMENTS

| | | | |
|---|---|---|---|
| 2,957,209 A | | 10/1960 | Schulze |
| 3,815,178 A | * | 6/1974 | Goldman ............... D01G 11/02 19/205 |
| 4,064,636 A | * | 12/1977 | Downing ............... F26B 20/00 34/60 |
| 4,087,316 A | * | 5/1978 | Jividen ............... C13K 13/002 127/37 |
| 4,259,764 A | * | 4/1981 | Downing ............... D01B 1/04 19/41 |
| 4,797,978 A | | 1/1989 | Giuliani |
| 5,586,412 A | * | 12/1996 | Wadlington ........... D01B 1/04 47/58.1 R |
| 6,539,585 B1 | | 4/2003 | Anthony |
| 7,526,837 B2 | * | 5/2009 | Maximov ............... D01B 1/48 19/7 |
| 7,972,458 B2 | * | 7/2011 | Nauta ..................... A47L 9/14 156/180 |
| 8,052,842 B2 | | 11/2011 | Pittman et al. |
| 8,336,170 B2 | * | 12/2012 | Wedegaertner .......... D01B 1/04 19/41 |
| 8,603,802 B2 | | 12/2013 | Sung et al. |
| 2009/0306253 A1 | | 12/2009 | Hansen |
| 2010/0176354 A1 | | 7/2010 | Costard |
| 2012/0324677 A1 | * | 12/2012 | Hao ....................... D01C 1/02 19/5 A |
| 2013/0167327 A1 | | 7/2013 | Lupien et al. |
| 2014/0000823 A1 | * | 1/2014 | Salminen ............... D01B 1/14 162/4 |

OTHER PUBLICATIONS

Ananda Chandra Tripathy, "Characterization of Flax Fibres And the Effect of Different Drying Methods for Making Biocomposites", Thesis, Apr. 2009, 124 pages.

\* cited by examiner

APPARATUS FOR PROCESSING OILSEED FLAX FIBER FOR USE IN BIOCOMPOSITE MATERIALS

CROSS-REFERENCE TO RELATED APPLICATIONS

This application is a divisional of U.S. Ser. No. 14/530,242, filed Feb. 24, 2015, which claims priority from U.S. Provisional Patent Application Ser. No. 61/943,740, filed on Feb. 24, 2014; U.S. Patent Application Ser. No. 61/948,863, filed on Mar. 6, 2014; and U.S. Patent Application Ser. No. 61/955,429, filed on Mar. 19, 2014, and as a continuation-in-part of U.S. patent application Ser. No. 14/087,326, filed on Nov. 22, 2013, the entirety of which are each expressly incorporated herein by reference.

FIELD OF THE INVENTION

The subject matter disclosed herein relates generally to biocomposite materials and, in particular, to a method and to process fibers from raw fibrous materials, such as oilseed flax, for use in the manufacture of biocomposite materials.

BACKGROUND OF THE INVENTION

Fibrous materials such as straw from flax, sisal, hemp, jute and coir, banana, among others, are used in the formation of biocomposite materials. Biocomposite materials utilizing these straws have enhanced desirable properties of the biocomposite material.

However, there is a need to increase the strength of the fibers used in the formation of these biocomposite materials, in order to create stronger, more durable biocomposites. Current flax fiber processing methods utilize beating and grinding steps during processing, which consequently damages the fibers while trying to separate the shive/hurds or other impurities from the fiber. This damage done to the straw fibers in turn decreases the strength and durability of the fibers when used to form the biocomposites that are produced with the fibers, and limits the number applications that the biocomposite materials can be used for as a result.

Therefore, it is desirable to develop a method for processing fibrous materials, and in particular flax materials, including, but not limited to oil seed flax, that does not damage the material thereby resulting in a fibrous material with increased strength that provides increased property enhancement of a biocomposite material incorporating the fibrous material.

SUMMARY OF THE INVENTION

According to one aspect of an exemplary embodiment of the present disclosure, a method is provided to process a source of a fibrous material without stressing and/or damaging the material to enable the material to retain its inherent strength when incorporated as a component of a biocomposite material, thereby leaving the fibers/fibrous material in good condition for chemical bonding when used to form the biocomposite material with a polymer(s). In the processing method, both retted and unretted straw are used as sources of the fibrous material for the processing method.

According to another aspect of an exemplary embodiment of the present disclosure, the processing method utilizes a system including a tumbler machine, pressurized air, and combing process to clean the fibers in a manner to avoid physically damaging the fibers. In the process, the fibers are then subjected to roving in a carder machine, and the rived fibers are subsequently sheared and then dried using a dehumidification process.

According to still another aspect of an exemplary embodiment of the present disclosure, the fibrous source material used in the process is a flax, such as an oilseed flax, instead of fiber.

According to a further aspect of an exemplary embodiment of the present disclosure, fibers of natural plant materials are used in the filling and reinforcement of formed biocomposite materials including the fibers. The fibers are obtained from the plant materials in a manner that enables the fibers to be substituted for the synthetic fibers and form chemical bonds with the other biocomposite material components to at least achieve similar mechanical characteristics for the biocomposite material as when synthetic fibers are used, in particular the tensile and flexural strength as well as impact toughness. In addition the use of the fibers of natural plant materials do not absorb and retain water, and thus do not detrimentally affect the waterproof properties of the biocomposite material. Further, the fibers of the natural plant component do not compromise the ability of the biocomposite material to be readily disposed of and/or recycled.

According to another aspect of an exemplary embodiment of the present disclosure, the natural plant fibers are mechanically treated prior to chemical treatment in order to obtain relatively pure plant material for use in the chemical extraction process. The particular mechanical treatment or decortication is accomplished in a manner that reduces the breakage of the core fibers, leaving the interior molecular structure of the fibers undamaged. This results in fibers that after further treatment can chemically bond with the components of the biocomposite composition to provide a stronger biocomposite composition with enhanced strength and lighter weight than other biocomposite materials.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate exemplary embodiments of the present invention in which the above advantages and features are clearly disclosed as well as others which will be readily understood from the following description of the illustrated embodiments.

In the drawings.

DETAILED DESCRIPTION OF THE INVENTION

Figure 1:
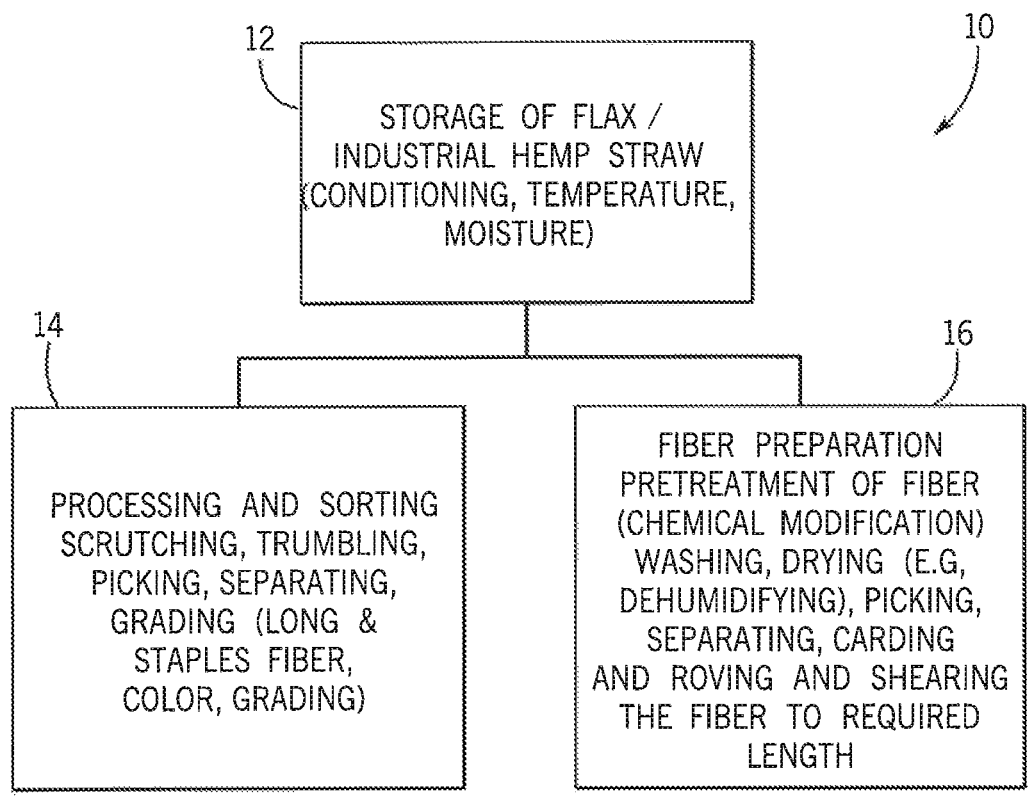
FIG. 1 is a schematic illustration of a first exemplary embodiment of an overall fibrous material processing method performed according to the present disclosure.
Figure 5:
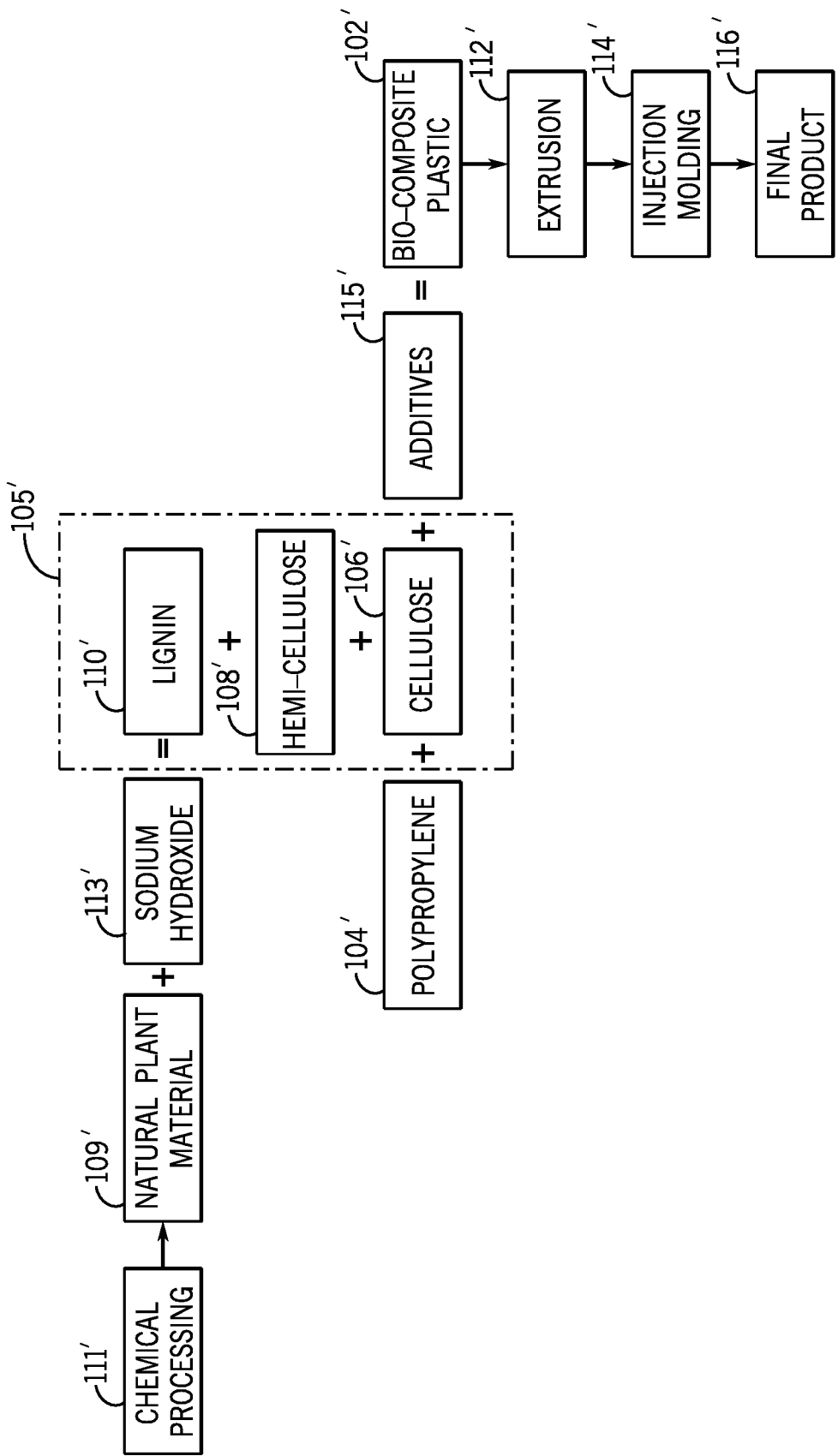
FIG. 5 is a schematic view of a first exemplary embodiment of a composite material production process according to the disclosure.
Figure 6:
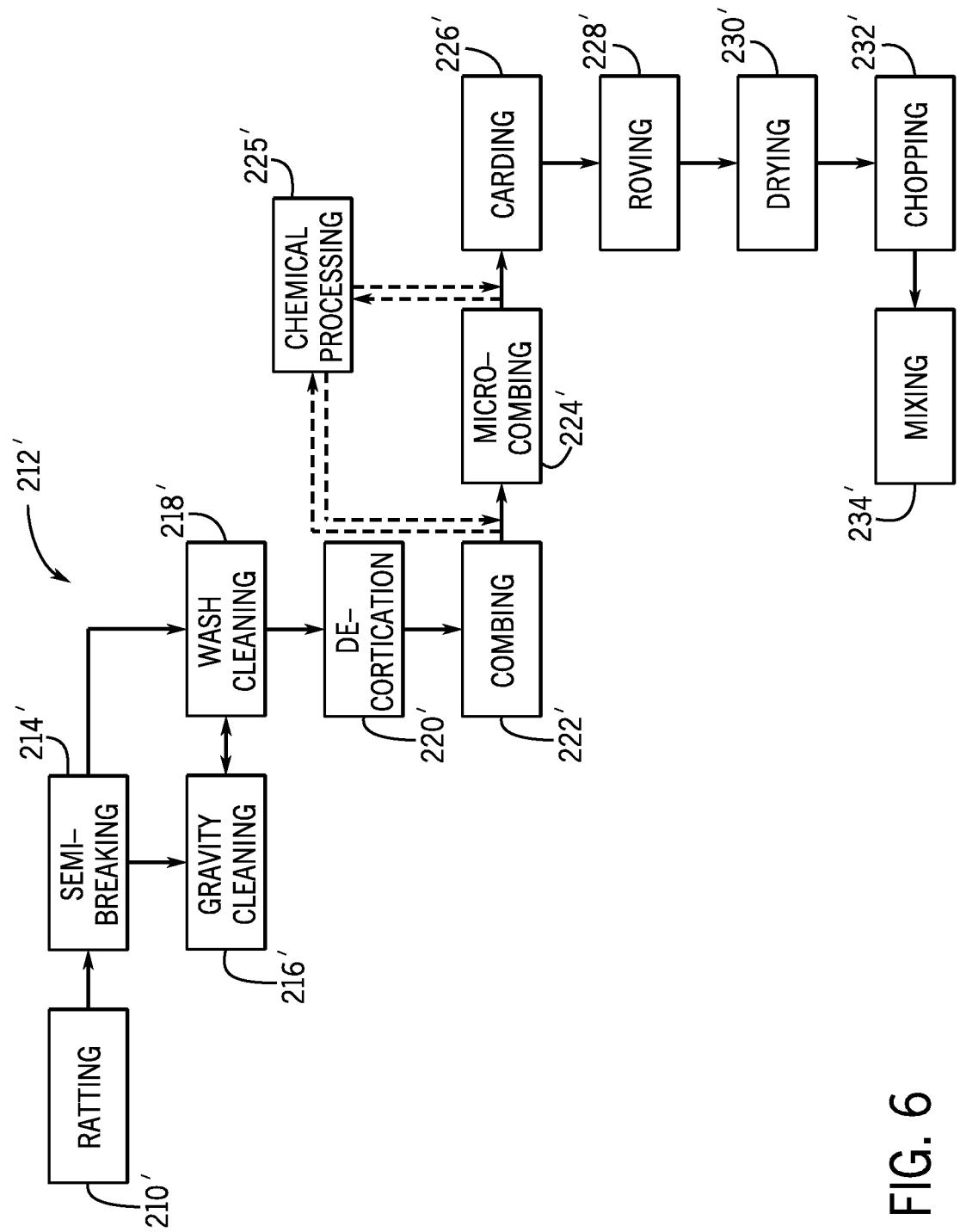
FIG. 6 is a schematic view of a second exemplary embodiment of a composite material production process according to the disclosure.

With reference now to the drawing figure in which like reference numerals designate like parts throughout the disclosure, one exemplary embodiment of a processing method provided for preparing various types of fibrous materials in order for use of the fibrous material, such as oilseed flax straw, as well as all types of fibrous materials (i.e. fiber flax, banana, jute, industrial hemp, sisal, coir) etc. in a biocomposite material is illustrated generally in FIG. 1. This process is related to the processes disclosed in co-owned and co-pending U.S. patent application Ser. No. 14/087,326, filed on Nov. 22, 2013, the entirety of which is expressly incorporated by reference herein. These processes include the following, as shown in FIGS. 5-6, illustrate an exemplary process for the formation of a product 116' created using a composite material 102'.

The composite material 102' is formed of a thermoplastic resin or material 104', which is the term used to denote polymer materials which are soft or hard at the temperature of use and which have a flow transitional range above the temperature of use. Thermoplastic resins or materials comprise straight or branched polymers which in principle are capable of flow in the case of amorphous thermoplastic materials above the glass transition temperature ($T_g$) and in the case of (partly) crystalline thermoplastic materials above the melting temperature ($T_m$). They can be processed in the softened condition by pressing, extruding, injection molding or other shaping processes to afford shaped and molded parts. The thermoplastic material 104' used in the present disclosure can be any suitable thermoplastic resin material or combination of multiple thermoplastic materials, such as a plastic including one or more natural or petroleum based thermoplastic resins such as polyethylene, polypropylene, polystyrene, polyvinyl chloride, polyacryl nitrite, polyamides, polyesters. polyacrylates and Poly Lactic Acid (PLA), among others. The thermoplastic material does not have to be a homopolymer but can also be in the form of a copolymer, a polypolymer, a block polymer or a polymer modified in some other fashion. Polypropylene is a particularly useful thermoplastic material for use in forming the composite material 102' of the present disclosure.

In addition to the thermoplastic material 104', the composite material 102' includes cellulose fibers 106'. These fibers 106' can be obtained from any suitable natural plant material 109', such as natural fibrous plant materials including a) seed fiber plants, in particular linters, cotton, kapok and poplar down, b) bast fiber plants, in particular sclerenchyma fibers, bamboo fibers, (stinging) nettles, hemp, jute, linen or flax (fibre flax and oil seed flax), and ramie, c) hard fiber plants, in particular sisal, kenaf and manila, d) coir, and e) grasses. Bast fiber plants, such as flax and hemp, are particularly useful natural non-woody, plant materials from which the cellulose fibers 106' can be obtained.

The bast plants include outer bast fibers that run longitudinally along the length of the plants and core tissue fibers disposed within the outer bast fibers. Because the core tissue fibers are the desired fibers, the outer bast fibers must be removed prior to use of the core fibers. In removing the outer bast fibers, care must be taken to avoid damaging or breaking the core tissue fibers in order to maximize the length of the core tissue fibers. Thus in a first step the straw is ratter under controlled environmental conditions (e.g., field rated, chemically rated and/or water rated) followed by mechanically treating the bast plant materials, in which the plant materials are decorticated by shearing the bast fibers from the core tissue fibers, as opposed to hammering or bending/flexing the plant material as in prior decortication processes. By shearing the bast fibers from the core tissue fibers, the core fibers can be kept intact more readily, thereby maintaining the overall strength and length of the core fibers. Using this process, core fibers of approximately 95-98% purity can be obtained. In addition, both ratted and non-ratted plant material can be used in the decortications process to obtain a clean core tissue fiber that can be used for production of the composite material.

In each case, the core fibers of the natural fibrous plant materials 109' include cellulose, hemi-cellulose and lignin components. To obtain the cellulose fibers 106' utilized to form the composite material 102' from the natural plant material, the hemi-cellulose fraction 108' and lignin fraction 110' are separated from the cellulose fibers or fraction 106', such that a purified crystalline cellulose fraction 106' can be added to the thermoplastic material 104' to form the composite material 102'.

To separate the cellulose fibers/fraction 106' from the hemi-cellulose fraction 108' and lignin fraction 110' of the natural plant material 109', any suitable chemical process 111' can be utilized, such as those employed on natural plant materials 109' for paper pulping, e.g., soda or kraft pulping, among others. More specific examples of processes for the separation of the hemi-cellulose fraction 108' and lignin fraction 110' from the cellulose fibers 106' of the plant material 109' include those that utilize an alkaline material 113', examples of which are disclosed in Hansen et al. U.S. Patent Application Publication No. 2009/0306253 and Costard U.S. Patent Application Publication No. 2010/0176354, among others, each of which are hereby expressly incorporated by reference herein in their entirety.

One suitable example is an alkaline separation process shown in Costard U.S. Patent Application Publication No. 2010/0176354 where a natural plant fiber material 109' is solubilized in an alkaline manner and which is characterized in that the natural fiber material 109' is treated with an alkaline material 113' without being subjected to mechanical stress a) at a temperature of between 5 and 30° C. and then b) at a temperature of between 80 and 150° C., and is then optionally washed and/or dried.

The alkaline materials 113' that can be used are, among other suitable alkaline materials, alkali metal hydroxide, in particular sodium hydroxide or potassium hydroxide, alkali metal carbonates, in particular sodium carbonate or potassium carbonate, or alkali metal phosphates, in particular trisodium phosphate or tripotassium phosphate.

The fiber degradation takes place at a pH of approximately between 8 to 14, preferably 10 to 14, more preferably 11 to 12 in the cold process (step a)) and preferably at a temperature of between 10 and 30° C., preferably between 10 and 25° C., in particular between 15 and 25° C., more preferably between 15 and 20° C.

The cold treatment according to step a) takes place over a period of 10 minutes to 3 hours, in particular 15 minutes to 2 hours and preferably 30 minutes to 1 hour.

The hot treatment used according to step b) of the natural fiber material also takes place between a pH of 8 to 14, preferably 10 to 14, more preferably 11 to 12, and preferably at a temperature of between 80° C. and 140° C., preferably between and 140° C., in particular between 90° C. and 135° C., more preferably between 100° C. and 135° C.

The hot treatment according to step b) takes place preferably over a period of 20 minutes to 1.5 hours, in particular 30 minutes to 1 hour and preferably 45 minutes to 1 hour.

The concentration of alkaline material in water in steps a) and/or b) is, based on the active ingredient (typically a solid), preferably in the range from 5 to 15 g/l, in particular 7 to 13 g/l, preferably 8 to 12 g/l, particularly preferably at about 10 g/l.

The process performed according to steps a) and b) effectively dissolves the hemi-cellulose fraction 108' and lignin fraction 110' from the natural plant material 109', which can subsequently be removed with the alkaline solution, leaving the cellulose fraction 106' behind for subsequent washing and drying to a desired moisture level, e.g., about 2% by weight or below.

The alkaline treatment according to the disclosure can be supported by adding excipients. Dispersants, complexers, sequestering agents and/or surfactants are suitable here. Water glass and foam suppressors can likewise optionally be used depending on the end-application. Other customary excipients can also be used. The addition of a complexer, dispersant and/or surfactant to the baths can accelerate and intensify the wetting of the fibers. The materials customarily used for these respective purposes in fiber treatment are suitable here.

When separated, the cellulose fibers 106' are at least 95% w/w pure cellulose fibers, i.e., the fibers 106' contain not more than about 5 weight percent of material other than cellulose, i.e., lignin and hemi-cellulose. Further, the cellulose fibers 106' have a mean fiber length of less than about 2 mm.

Once liberated from the natural plant material 109', the cellulose fibers 106' can be utilized to form the composite material 102'. These fibers 106' can be colored easily as the fibers 106' are very light, i.e., almost white in color and the composite made out of these is odorless. Chemical treatment of fiber 106' affects the cellulose structure, e.g., decreasing crystallinity and increasing the amorphous structure. For example, the chemical treatment opens the bonds in the cellulose fraction or fibers 106' for interaction with the polymer matrix 104' in forming the composites 102'. The composite material 102' of the present disclosure may mixed together and processed by extrusion, compression molding, injection molding, or any other similar, suitable, or conventional processing techniques for synthetic or natural biocomposites.

FIG. 5 shows one embodiment of the processing of the composite material 102' of the present disclosure. The ingredients of the composite material 102', i.e., a thermoplastic material 104' and the cellulose fibers 106', may be blended or compounded with one another in a manner effective for completely blending the cellulose fibers 106' with the thermoplastic material 104', such as in a suitable mixer, e.g., a high or low intensity mixer. Depending upon the particular composition of the thermoplastic material 104' and the cellulose fibers 106', the temperature of the mixer in one embodiment should be from about 140° C. to about 220° C. for the proper combination of the components to form the composite material. One example of a mixer effective for blending the fibers 106' and thermoplastic material 104' is a high intensity thermokinetic mixer. In these types of mixers, frictional energy heats the contents until they become molten, a process that takes seconds or minutes depending on the speed of the impeller. In another aspect of the invention, heat from an external source can be supplied to melt the thermoplastic material 104' and effect blending of the cellulose fibers 106'. An example of a low intensity mixer is a ribbon blender.

The formulation of the composite material 102' can be tailored by modifying the amounts or ratios of the thermoplastic material 104' and the cellulose fibers 106' used to form the composite material 102' depending on the particular application and/or function for the composite material 102'. Additives (including, but not limited to, flow enhancers, anti-oxidants, plasticizers, UV-stabilizers, foaming agents, flame retardants, etc.) are used in formulation to enhance the functionality of the composite product. To accommodate the particular use and corresponding required properties of the composite material 102', the blending of the polymers/thermoplastic material 104' and the fibers 106' can also be varied in temperature and pressure. In addition, the blending parameters and component ratios for the composite material 102' can be altered depending upon the particular pant material from which the fibers 106' are obtained. Examples of the polymers used as the material 104' include, but are not limited to acrylonitrile butadiene styrene, polyethylene, polypropylene, polystyrene, polyvinyl chloride, polyacryl nitrite, polyamides, polyesters, polyacrylates, other engineering plastics and mixtures thereof.

In some particular embodiments of the composite material 102', the weight ratios/percentages of the thermoplastic material 104' and the cellulose fibers 106' used in the formation of the composite material 102' range from 1-60%. The fiber loading in biocomposite for the following process can be varied from process to process. Exemplary fiber loading percentages according to various molding processes in which the biocomposite material 102' is used are as follows:

a. Extrusion products: 1-30% (product examples: pipes, profiles)
b. Injection molding: 1-45% (product examples: small to large components for various industries such as agricultural machinery products, automotive interior and under hood products etc.).
c. Compression molding: 1-60% (product examples: kitchen cabinets, bicycle components, interior products for agricultural machineries (such as combine, tractor, and automotive (car, bus etc.).
d. Rotational molding: 1-30% (product examples: water tanks, large storage boxes)
e. Vacuuming forming/Thermoforming: 1-20% (product examples: packaging materials, cups, plates, boxes, building insulation)

In one particular embodiment, the mixing/extruding of the thermoplastic material 104' and the cellulose fiber 106' to form the composite material 102' is performed with a dry blender, mixer, parallel screw extruder. The parallel screws in the device serve to blend the fibers 106' homogeneously with the polymer 104', while also reducing the damage and/or breakage of the cellulose fibers 106' in the mixture forming the composite material 102'. In addition, the parallel screws help to reduce the residence time of the composite material formulation 102' by increasing the speed of mixing of the components of the composite material 102' in the device.

As a result of the use of purified cellulose fibers 106' obtained via the mechanical and chemical processing described previously, the fibers 106' develop a molecular bonding with the thermoplastic material 104' when blended to form the composite material 102' which provides superior performance to composite materials having only mechanical binding between the polymer and the reinforcing fibers. Without wishing to be bound by any particular theory, it is believed that this molecular bonding occurs as a result of the thermoplastic material 104' flowing into and filling the inside the modified fibers 106' during the mixing/extrusion process. The increase in the melting temperature of the biocomposite 102' indicates a possible polymerization effect of the fiber that diffuses or dissolves into the polymer in the composite and correspondingly increases the thermal resistance of composite. Due to the porous surface of the treated fiber, molten polymer matrix enters in to the porous fiber and interlocks with each other and to form a strong binding within the biocomposite 102'. Further investigation is required to determine the exact nature of bond. In addition, polymer matrixes encapsulate the fiber and enhance the biocomposite strength and reduce the porosity and the formation of air pockets within the biocomposite. This molecular bonding between the fibers 106' and the thermoplastic material 104' significantly improves the properties of the composite material 102', e.g., mechanical properties including tensile and flexural strength as well as impact toughness, and thermal properties. The properties of the biocomposite 102' vary as a result of the fiber loading and the type of polymer and/or additives used in the formation of the biocomposite 102'. This, in turn, enhances the functionality of products 116' formed of the composite material 102' and enable the products 116' to be used in a wider range of industrial applications than prior fiber-reinforced materials. Also, in conjunction with the reduction in processing time in the parallel screw device, the molecular bonding between the fibers 106' and the polymer 104' limits any significant reduction of inbuilt additives present in polymer/thermoplastic material 104'. As a result, it is only necessary to supplement any required additives, such as bonding additives, present in the polymer 104' during the formulation of the composite material 102', as opposed to adding the entire amount of the additives outside of those contained in the polymer 104'.

Once mixed/compounded, the melted composite material 102' can be allowed to cool to room temperature and then further processed by conventional plastic processing technologies. Typically, the cooled blend is granulated into fine particles. The fine particles are then utilized for extrusion 112', injection 114' and/or compression molding to form finished parts or products 116'.

In an alternative embodiment, the mixer can be operated without heat, such that the thermoplastic material 104' and cellulose fibers 106', after being mixed together, are transferred to a feed hopper, such as a gravity feed hopper or a hopper with a control feed mechanism. Alternatively, the thermoplastic material 104' and the cellulose fibers 106' can be individually fed to the extruder without being previously mixed together. The feed hopper transfers the composite to a heated extruder 112'.

The extruder 112' blends the ingredients under sufficient heat and pressure. Several well-known extruders may be used in the present invention, e.g., a twin screw extruder. The extruder 112' forces or injects the composite material 102' into a mold 114'. In an exemplary embodiment, the flow rate of the extruder 112' may be between about 150 and 600 pounds per hour. In other embodiments, the flow rate may be higher or lower depending on the type and size of the extruder 112'. The injection mold 114' may be made up of one or more plates that allow the composite material 102' to bond and form a shaped-homogeneous product 116'. A typical plate may be made from hardened steel material, stainless steel material or other types of metals. A cooling system (e.g., a liquid bath or spray, an air cooling system, or a cryogenic cooling system) may follow the injection mold 114'.

In the mixer, a number of optional processing aids or additives 115' can be added to the thermoplastic material 104' and the cellulose fibers 106'. These processing aids or modifiers act to improve the dispersion of fibers 106' in the thermoplastic polymer material 104' and also help further prevent the absorption of water into the fibers 106' and improve the various thermal, mechanical and electrical properties of the composite material 102', e.g., the strength of the resulting composite material 102'. The addition levels of the modifiers or compatibilizers used depends on the target properties. For example, where higher tensile and flexural strengths are desired, higher levels of modifier or compatibilizer will be required. A compatibilizer is not required to achieve higher stiffness.

In one particular example of the present disclosure, the composite material 102' includes an amount of an wear additive 115' selected from aluminum or copper powder, or combinations thereof to increase the wear properties and enhance the longevity of the final product 116'.

With regard to the molding processes 114' used to form the final product 116', the composite material 102' improves the product 116' formed by these processes 114' through the reduction of the formation of pin holes and the porosity of the material product 116'. Without wishing to be bound by any particular theory, it is believed that these results are achieved in the composite material 102' as a result of the close packing and increased density of the fibers 106', polymer 104' and additives 115' due to the properties of the cellulose fibers 106', and the consequent removal of entrapped air bubbles during the processing of the fibers 106' and thermoplastic material 104', along with the additives 115', to form the composite material 102'. As a result, the final product 116' is more solid and stronger than products formed from prior fiber-reinforced materials.

Further, with the use of the cellulose fibers 106' formed in the above-described manner, it is possible to achieve higher grade properties (mechanical, thermal, electrical, etc.) for the final product 116' while using lower grade thermoplastic materials 104' in combination with the cellulose fibers 106'. In particular, as a result of the properties and purity of the cellulose fibers 106', the fibers 106' can bond well with a wide range of grade of polymeric/thermoplastic materials 104' to achieve products 116' with the desired properties. Further, to address any issues presented by the particular polymer/thermoplastic material 104', the weight percentage or weight ratio of the fibers 106' can be increased in formulation of composite material 104' without compromising the quality and desired properties of the final product 116'. In addition, by increasing the amount of the cellulose fibers 106' utilized in the composite material 102', the consequent consumption of the polymer 104' will be reduced.

For a better understanding of the objects and advantages of the present invention, the same will be now described by means of several examples. However, it should be understood that the invention is not limited to such specific examples, but other alterations may be contemplated within the scope and without departing from the spirit of the invention as set forth in the appended claims.

While the formulation of the particular biocomposite material 102' depends on the final product 116' formed from the biocomposite material 102', its functionality, and/or as described above the particular molding process used to form the biocomposite material 102' into the final product 116'.

In one example of biocomposite composition 102', the formulation includes:
a) natural/petroleum based thermoplastic material(s): 99-40% w/w
b) fiber 1-60% w/w
c) additives 1-5% w/w.

Biocomposite materials 102' of different grade (e.g., extrusion grade, injection grade, compression grade, rotational grade, vacuum forming grade) are manufactured by changing the formulation of the biocomposite material 102', and in one example by changing the amount of fiber 106' present and consequently adjusting the percentages of the remaining components.

One particular example of a thermoforming/vacuum forming formulation for the biocomposite material 102' is as follows:
a) polystyrene
b) treated natural fiber
c) butane
d) additives (zinc stearate, magnesium stearate)
e) talcum powder.

Other examples of biocomposite material 102' formed according to the present disclosure are found in the following tables. The properties can be modified according to product requirement by changing/modifying the formulation

TABLE 1

| Properties Flax straw/ Industrial | | Liner low density polyethylene-dicumyl peroxide pretreated flax fibre | | | | | | | |
|---|---|---|---|---|---|---|---|---|---|
| Hemp stalk Composite | | Unretted | | Field retted | | Water retted | | Chemically retted | |
| properties | Unit | Flax | Hemp | Flax | Hemp | Flax | Hemp | Flax | Hemp |
| Melt Flow Index | g/10 min | 2.8 | 2.6 | 3.7 | 3.5 | 4.1 | 3.4 | 3.8 | 3.5 |
| Melting point | °C. | 130 | 128 | 129 | 127.4 | 130.1 | 128 | 130.6 | 129 |
| Tensile Strength | Mpa | 13.2 | 15.3 | 17.6 | 16.9 | 18.3 | 18.7 | 22.2 | 21 |
| Tensile Impact strength | KJ/m$^2$ | 178 | 172 | 188 | 182 | 194 | 178 | 223 | 205 |
| Hardness | SD | 12 | 11 | 17 | 18 | 18 | 17 | 23 | 21 |
| Water absorption @ 50 RH | % | 3-5 | 2-6 | <1 | <1 | <1 | <1 | <1 | <1 |

TABLE 2

| Properties Flax straw/ | | Liner low density polyethylene-triethoxyvinylsilane pre-treated flax fibre | | | | | | | |
|---|---|---|---|---|---|---|---|---|---|
| Hemp stalk Composite | | Unretted | | Field retted | | Water retted | | Chemically retted | |
| properties | Unit | Flax | Hemp | Flax | Hemp | Flax | Hemp | Flax | Hemp |
| Melt Flow Index | g/10 min | 2.0 | 22 | 27 | 2.4 | 2.6 | 2.4 | 2.8 | 2.4 |
| Melting point | °C. | 129 | 131.2 | 128.6 | 129 | 129 | 129 | 129 | 129.6 |
| Tensile Strength at Yield | Mpa | 15 | 14.2 | 18.4 | 17.1 | 20.1 | 17.4 | 19.3 | 17.9 |
| Tensile Impact strength | KJ/m$^2$ | 178 | 161 | 188 | 186 | 199 | 193 | 218 | 209 |
| Hardness | SD | 9 | 11 | 14 | 15 | 19 | 19 | 20 | 18 |
| Water absorption @ 50 RH | % | 3-5 | 2-6 | <1 | <1 | <1 | <1 | <1 | <1 |

TABLE 3

| Properties Flax straw/ | | High density polyethylene-benzoyl chloride pre-treated flax fibre | | | | | | | |
|---|---|---|---|---|---|---|---|---|---|
| Hemp stalk Composite | | Unretted | | Field retted | | Water retted | | Chemically retted | |
| properties | Unit | Flax | Hemp | Flax | Hemp | Flax | Hemp | Flax | Hemp |
| Melt Flow Index | g/10 min | 1 | 1.2 | 1.6 | 1.5 | 1.8 | 1.7 | 1.8 | 1.4 |
| Melting point | °C. | 130 | 128 | 130 | 130 | 129 | 130 | 129 | 130 |
| Tensile Strength at Yield | Mpa | 16.3 | 13.7 | 16.3 | 16.2 | 18 | 18.1 | 23.4 | 19.2 |

TABLE 3-continued

| Properties Flax straw/ Hemp stalk Composite properties | | High density polyethylene-benzoyl chloride pre-treated flax fibre | | | | | | | |
|---|---|---|---|---|---|---|---|---|---|
| | | Unretted | | Field retted | | Water retted | | Chemically retted | |
| | Unit | Flax | Hemp | Flax | Hemp | Flax | Hemp | Flax | Hemp |
| Tensile impact strength | KJ/m² | 167 | 157 | 177 | 179 | 188 | 185 | 221 | 178 |
| Hardness | SD | 17 | 11 | 12 | 15 | 19 | 22 | 21 | 19 |
| Water absorption @ 50 RH | % | 3 | 2 | <1 | <1 | <1 | <1 | <1 | <1 |

TABLE 4

| Properties Flax straw/ Hemp stalk Composite properties | | High density polyethylene-dicumyl peroxide pre-treated flax fibre | | | | | | | |
|---|---|---|---|---|---|---|---|---|---|
| | | Unretted | | Field retted | | Water retted | | Chemically retted | |
| | Unit | Flax | Hemp | Flax | Hemp | Flax | Hemp | Flax | Hemp |
| Melt Flow Index | g/10 min | 0.5 | 0.8 | 1.0 | 1.5 | 1.2 | 1.6 | 1.6 | 1.5 |
| Melting point | °C. | 130 | 126 | 131.6 | 128.4 | 128 | 129 | 129 | 128 |
| Tensile Strength at Yield | Mpa | 15 | 14.3 | 16.8 | 1.54 | 17.5 | 18.1 | 24.1 | 21.2 |
| Tensile Impact strength | KJ/m² | 180 | 167 | 197 | 180 | 185 | 185 | 220 | 180 |
| Hardness | SD | 13 | 9 | 14 | 12 | 15 | 12 | 17 | 15 |
| Water absorption @ 50 RH | % | 3 | 2 | <1 | <1 | <1 | <1 | <1 | <1 |

Oilseed flax and industrial hemp fiber has promising future in the plastic industries. It is observed that unretted and chemically retted flax and hemp can be used in plastic composite (LLDPE and HDPE). Chemically retted fiber increased the $T_m$ of composite compared to pure polyethylene. The increase of $T_m$ may be attributed to the polymerization effect of the fiber that diffuses or dissolves into the polymer in composite and increased the thermal resistance of composite. This investigation indicated that chemical retting has a great influence on mechanical properties of (flax and hemp) polymer composites products developed through rotational molding processes.

Looking now at FIG. 6, a second embodiment of the process for forming the biocomposite material 102' formed with a thermoplastic material 104' is shown according to the present disclosure.

Similar to the first exemplary embodiment in FIG. 5, in addition to the thermoplastic material 104', the biocomposite material 102' includes plant material fibers 106'. These fibers 106' can be obtained from any suitable natural plant material 109', such as natural fibrous plant materials including a) seed fiber plants, in particular linters, cotton, kapok and poplar down, b) bast fiber plants, in particular sclerenchyma fibers, bamboo fibers, (stinging) nettles, hemp, jute, linen or flax (fibre flax and oil seed flax), and ramie, c) hard fiber plants, in particular sisal, kenaf and manila, d) coir, and e) grasses. Bast fiber plants, such as hemp and oil seed flax, are particularly useful natural non-woody, plant materials from which the fibers 108' can be obtained.

The bast plants include outer bast fibers that run longitudinally along the length of the plants and core tissue fibers disposed within the outer bast fibers. Because the core tissue fibers are the desired fibers, the outer bast fibers must be removed prior to use of the core fibers. In removing the outer bast fibers, care must be taken to avoid damaging or breaking the core tissue fibers in order to prevent damage from being done to the interior molecular structure of the core fibers, as well as to maximize the length of the core tissue fibers. Thus in a first step 210' the plant material or straw 109' is ratted in a storage location for the straw or other desired plant material under controlled environmental conditions (e.g., field ratted, dew ratted, chemically ratted and/or water rated). Additionally, in an alternative embodiment, the oil seed flax or other plant material 109' can be utilized without step 110', such that the material is unretted.

After step 210', the plant material 109' is cleaned in step 212'. To clean the plant material 109', initially the material is semi-broken in step 214' by using a roller breaker at low rpm with little or no stress applied to the plant material 109'. Subsequently the plant material is air and gravity cleaned in step 216' by placing the plant material in a suitable tumbling machine (uniaxial/biaxial/multiaxial/rock and roll) with a fixed low rpm and directing a high speed air flow past and around the plant material as is it tumbled in the machine. This action separates any loosely attached sieve and dust from the plant material 109'. After tumbling, in step 218' the plant material 109' is cleaned in a suitable cleaning device to remove the remaining sieve and dust from the plant material 109'. If the straw is too dirty, e.g., mud is attached to it, then it can be washed in water in between 22° C. to 50° C. and dried for further mechanical processing.

Once the straw or plant material 109' has been cleaned, in step 220' the bast plant materials are mechanically treated, in which the plant materials are decorticated to remove the bast fibers from the core tissue fibers 105', as opposed to hammering or bending/flexing the plant materials 109' as in prior art decortication processes. By decorticating the bast fibers from the core tissue fibers 105', the core fibers 105' can more readily be kept intact, thereby maintaining the overall interior molecular structure and corresponding strength intact, and maintaining an increased length of the core fibers 105'. Various processes for decortication can be used, so long as the process places little or no stress on the core fibers 105' so that the interior molecular structure remains undamaged, unlike other prior art processes that involve hammering or bending the plant material to remove the bast fibers. Some examples of decortication processes that can be used in step 220' include tumbling, scutching, picking and grading the plant materials 109'. Using these processes, core fibers of approximately 95-98% purity can be obtained. In addition, both ratted and non-ratted plant material 109' can be used in the decortications process to obtain a clean core tissue fiber 105' that can be used for production of the composite material.

Once removed from the bast fibers, the crude core fibers 105' are passed through at least one or more, and in one embodiment, a series of five (5) machines to produce the fine, clean and uniform core fibers 105' for use as biocomposite reinforcement fibers. First, the crude core fibers 105' are moved in step 222' to a combing machine in order to eliminate any remaining shive and to align the fibers into a clean fiber bundle.

In step 224', the bundles of the clean, crude core fibers 105' are passed through a micro-combing process which serves to open the crude fibers and separate the individual core fibers 105' in the bundle from one another. In performing this individual fiber separation, the aspect ratio of the individual fibers 105' is increased to enhance the reinforcement effect of the fibers 105' in the biocomposite. In this step 224', or as a modification to step 224', the fibers 108' can have an antistatic lube applied thereto to enhance the separation of the fibers 105'.

In step 226', once separated the individual fibers 105' can be processed through a carder to align the finer premium quality fibers (clean, long, align, more uniform, strong) while discarding the lower quality fibers. The high quality fibers 105' are then combined in a suitable device into a roving, or a rope-like alignment of the fiber matrix in step 228', which is subsequently dried, by using drier such as in a dehumidifier, a thin layer drier cabinet, an oven or an RF or microwave drier, among other suitable devices to keep it dried. Drying conditions depend upon the particular device and the drying requirement (0-6% water w/w or v/v) and RH in step 230'.

In step 232', the roving from step 230' is chopped or sheared into the desired size having the highest aspect ratio (i.e., length to diameter, for example 2 mm fiber for short biocomposite) for optimum reinforcement of the biocomposite material 102'. The chopped roving can then be added in step 234' to the thermoplastic material 104' in either a pre-mixed state or directly into the hopper of an extrusion or injection molding machine to form the reinforced biocomposite material 102'. The combination or mixing of the roving with the thermoplastic material 104' in step 234' can be accomplished by spraying the chopped fiber material 108 into the thermoplastic material 104', or by any of the manners and processes described previously with regard to the embodiment of FIG. 6 with any of the disclosed additives, processing aids disclosed with regard to the embodiment of FIG. 6.

There may be two ways fiber can be processed. One without chemical treatment and the other with a chemical treatment. In both cases the same mechanically fiber processing steps need to be followed. Prior to either the combing step 222' or the micro-combing step 224', the core fibers 105' of the natural fibrous plant materials 109' can be chemically treated as illustrated in step 225' in order to separate the cellulose fibers 106' from the hemi-cellulose and lignin components 108' and 110' of the core fibers 105' or crude fiber can be processed and later it can go for chemical treatment prior to develop biocomposite formulation. The process employed in step 225' is similar to that used in step 111' of the embodiment of FIG. 6, such that a purified crystalline cellulose fraction of fibers 108' having an intact internal molecular structure can be added to the thermoplastic material 104' to form the composite material 102'.

Once liberated from the natural plant material 109' in step 225', the cellulose fibers 106' can be further processed in either the micro-combing step 224' or both the combing step 224' and micro-combing step 226' to form cellulose fibers 106' having the desired attributes for addition to the thermoplastic material 104' to form the biocomposite 102' as described above.

In the illustrated embodiment of FIG. 1, the method includes an initial step 12 of harvesting and storing the source fibrous material to be conditioned for use in the biocomposite. During storage, the fibrous material is kept under controlled conditions for temperature and moisture, among others, such as in a ventilated container or storage warehouse (not shown) that can be maintained free from mold and mildew.

In step 14, from the storage location, the fibrous material is removed from the storage enclosure and processed and sorted in a number of methods to obtain the fibers from the fibrous material. Subsequently to the processing and sorting of the fibrous material, in step 16 the fibers are prepared in any of a number of different processes for use as a component in the manufacture of a biocomposite material, such as those described above.

Figure 2:
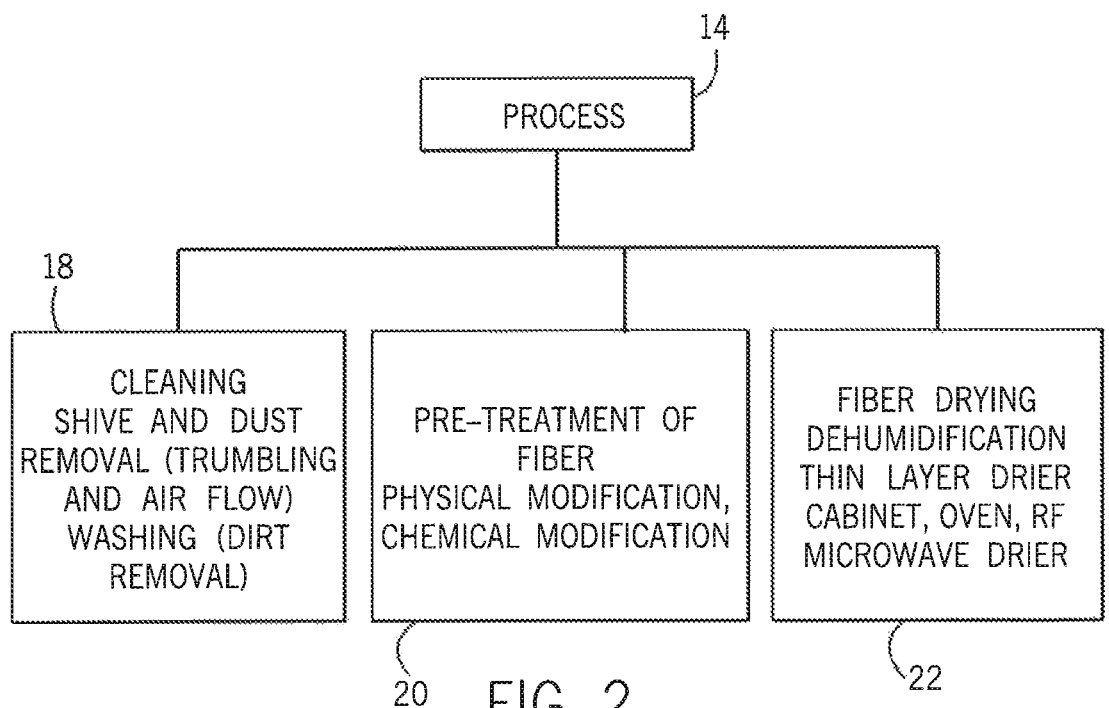
FIG. 2 is a schematic view of an exemplary embodiment of the fiber processing and sorting step of the method of FIG. 1.

Referring now to FIG. 2, the processing and sorting step 14 initially includes the various steps of cleaning the fiber in step 18, physically and/or chemically modifying the fiber in fiber processing step 20, and drying the fiber in step 22, which can include the steps below alone and in conjunction with the various combinations of the process and method steps illustrated and disclosed regarding FIGS. 5-7.

More specifically, after separation of fiber from the straw in step 14, the crude fiber must be cleaned prior to usage in forming a biocomposite. Thus, in one exemplary embodiment of step 18, the crude fiber is put inside a rotating tumbler (not shown) including a high speed fan (not shown) attached thereto in order to separate the unwanted dust and shive from the crude fiber. The tumbler is essentially a large mesh drum which is rotated to tumble the amount of crude fiber placed therein while directing the air flow from the fan across the fiber to remove the shive and dust from the crude fiber by blowing the shive and dust off of the crude fiber and out of the tumbler. To clean the crude fibers, the fibers are retained in the tumbler with an air flow from the fan directed onto the fibers for between 30-60 minutes, and optionally around 45 minutes, to get a partially clean fiber.

From the tumbler, as a continuation of step 18 or the beginning of step 20, the partially cleaned fibers then pass through a combing process in a device called a picker, as is known in the art. As the fibers pass through the picker, the fibers are opened and separated from the incoming bunches of fibers from the tumbler into individual fibers in order to create consistency between the fibers while also removing any shive, hurds and dust or dirt still embedded within and/or between the fibers. From the picker, the fibers are subsequently aligned and chopped to the required size using a cutter, and, if necessary, the fibers can be re-run through the tumbler and/or picker to further clean the fibers.

As the fibers exit the picker after being sufficiently cleaned, in pre-treatment step 20 the fibers are directed into a wet conditioning chamber (not shown) as is known in the art for physical modification, such as by washing the fiber with warm water to remove wax, pectin and any dust or muds materials attached to the fiber, or can go or be positioned directly within a cleaning chamber (not shown) where the fibers are cleaned. Upon exiting the cleaning chamber, the fibers are chemically modified, such by placing the fibers within a device and using a method shown in co-owned and U.S. Patent Application Ser. No. 61/955,429, filed on Mar. 19, 2014, the entirety of which is expressly incorporated by reference herein, prior to drying in step 22. In this drying step 22, the cleaned and physically and chemically modified fibers can be placed within a suitable drying device (not shown), such as a dehumidification cabinet disclosed in co-owned and U.S. Patent Application Ser. No. 61/948,863, filed on Mar. 6, 2014, and which is expressly incorporated herein by reference in its entirety. After drying in step 22, the cleaned and dried fiber pass through to separation step 16 in order to completely separate the fiber s from one another prior to mixing with a polymer(s) to form a biocomposite formulation.

Figure 3:
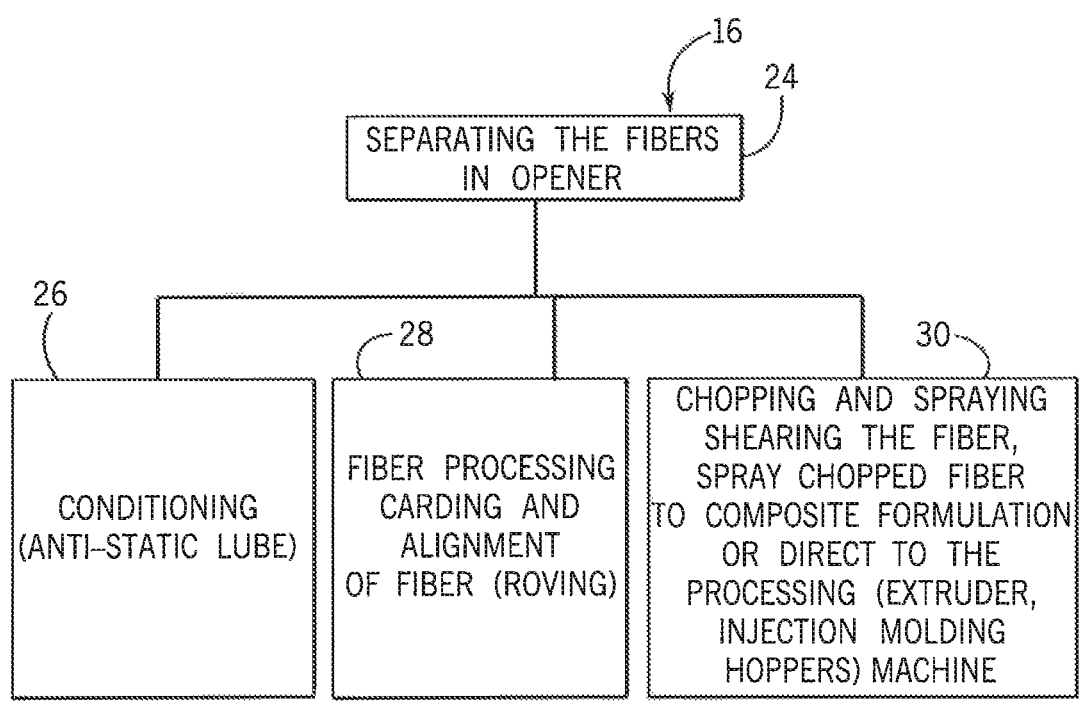
FIG. 3 is a schematic view of an exemplary embodiment of the fiber preparation step of the method of FIG. 1.
Figure 4:
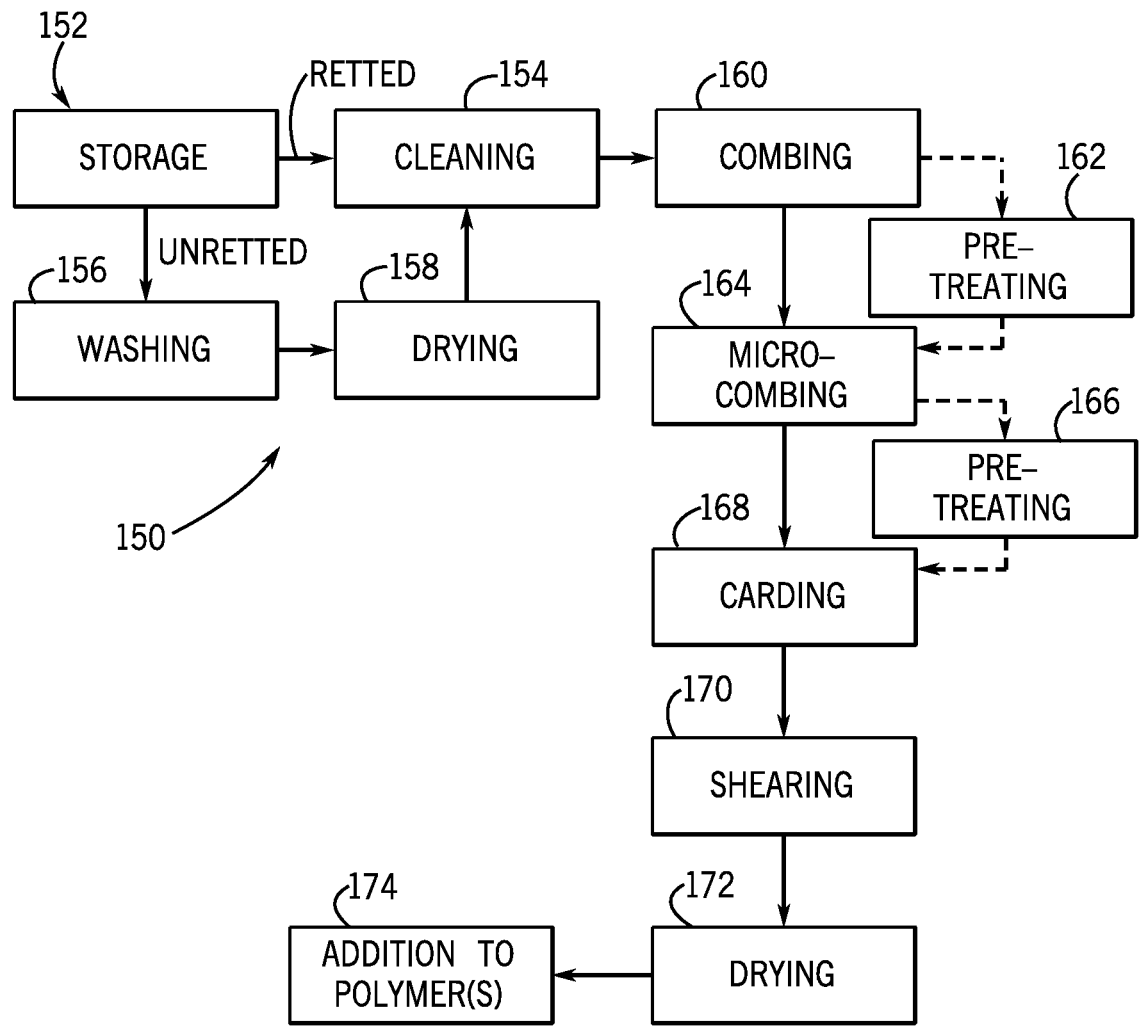
FIG. 4 is a schematic view of a second exemplary embodiment of an overall fibrous material processing method performed according to the present disclosure.

In FIG. 3, the preparation step 16, which in certain embodiments can additionally include the physical and/or chemical modification step 20 and/or the drying step 22, as well as modifications, additions or subtractions from these steps, optionally with those steps in the disclosure regarding FIGS. 4-6 described above, includes the separation of the fibers in step 24 along with the conditioning of the fibers in step 26 such as by adding an anti-static agent to the fibers, then roving, carding and/or alignment of the fibers in step 28 and the chopping and spraying of the fibers in step 30 and/or directing the formed biocomposite material with the fibers to a forming machine, such as an extruder and/or molding machine.

Looking now at FIG. 4, in an alternative exemplary embodiment of the process 150, with regard to the form of the fibers as they enter the overall process 150, there are two (2) initial states that the fibrous material, e.g., flax straw, can be introduced from storage 152 to a fiber breaker machine (not shown) as is known in the art for processing using the method or process 150, namely, retted and unretted. With retted fibrous material or straw, in step 154 the straw is initially put into a tumbler machine, which again is a large mesh covered drum which rotates under the control of a variable speed motor (not shown) attached to the drum to control the rpm of the tumbler and removes shive and dust from the straw. In the tumbler, the straw is air and gravity cleaned by the rotation of the straw in the drum and the direction of an air flow across and through the straw as it is rotated by a high-speed fan (not shown) utilized in conjunction with the rotating drum. This cleaning step 154 separates loosely attached shive from the fibers, and cleans off any dirt and dust particles, which produces crude fibers as a result.

With unretted straw, prior to step 154 this type of straw of fiber is placed in a combination washing and chemical modification machine/chamber (not shown) such as that shown in co-owned and U.S. Patent Application Ser. No. 61/955,429, filed on Mar. 19, 2014, and used in an exemplary methods shown in co-owned and co-pending U.S. patent application Ser. No. 14/087,326, filed on Nov. 22, 2013, which is described above and illustrated in FIGS. 5-6, each of which are expressly incorporated by reference herein in their entireties, including an amount of a suitable washing agent in step 156, and then left to dry in step 158, where the wet fiber is placed in a dehumidification system such as that used in step 22 of the prior exemplary embodiment, where the water is removed and fiber is dried at low temperature under a humidity-controlled environment to reduce and prevent fiber discoloration, odor, and decomposition. Once dried such as, for example, to a moisture content of from between 8-12% weight basis (wb) as measured by the ASAE S358.2, 1997 standard, the straw is then placed in the tumbler in step 154 as used for cleaning the retted straw in step 154, where it also undergoes air and gravity cleaning in a suitable device to produce crude fibers.

Next the crude fibers are sent in step 160 through a cylindrical combing process/device, such as a picker, which in one embodiment includes numerous fine metal fingers or nails extending outwardly from a rotating drum attached to a variable speed motor. In operation, the crude fiber passes and is engaged by the fingers on the drum as it moves on a conveyer belt disposed adjacent the drum. The crude fibers are combed through by the fingers/nails to separate the fibers and remove additional shive and dust in step 160 to completely separate the shive from the fiber, and to align the fibers into a clean bundle.

At this stage the fibers can be pre-treated (i.e. physically, such as by decortications, chemically, etc.) in optional step 162, such as by placement within the combination washing and chemical modification machine/chamber disclosed with respect to 20 of the previous embodiment and step 154 of this embodiment, in which the washing and chemical modification provided by the device protects the fiber quality while concurrently reducing fiber stress and fiber damage, or can be left untreated. In either case, the fiber bundle then undergoes a micro combing process in step 164, which is similar in form to the combing process of step 160, but in which the combing metal fingers are very fine and attached to each other, to separate the individual fibers, enhancing the aspect ratio and reinforcement characteristics of the individual fibers. At this stage the fibers can be pre-treated in an optional step 166 in the same or in a different manner as done in step 162 if the fiber has not already been pre-treated in step 162, to create a random orientation of the fibers, or can be left untreated to create an oriented long fiber composite by blending the fibers with a polymer yarn formed by the micro combing step 160.

Next the oriented individual fibers are processed through the carder in step 168, which aligns the finer, premium quality fibers to produce a roving, which is a rope-like structure, but is not twisted like a rope. The roving is subsequently sheared, such as in a cutter (not shown) as is known in the art, in step 170 to the required size in order to maximize the aspect ratio of the fiber, thereby maximizing the strength characteristics of the fibers. The sheared fibers formed in step 170 can subsequently be used in step 174 to form the biocomposite in either a pre-mixed state with the polymer(s) used to form the biocomposite, or can be introduced into the polymer on the manufacturing line (i.e. for extrusion and injection molding) to save time and energy. However, prior to introduction into the polymer, the fiber is or may be dried in step 172 through a dehumidification process, such as by placement within a suitable dehumidifying cabinet such as that discussed above with regard to step 22 of the previous embodiment, which manages the fiber quality and has reduced energy consumption.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for processing fibers of fibrous material for use in formation of a biocomposite material, the apparatus comprising:
   a device for cleaning the fibrous material to separate fibers from other materials in the fibrous material; and
   a mechanism for pre-treating the fibers comprising a mechanical shearing device and a chemical separation device, wherein the mechanical shearing device is configured to shear the fibers to decorticate bast fibers of the fibers from core tissue fibers of the fibers.

2. The apparatus of claim 1, wherein the mechanism for pre-treating the fibrous material includes a combing device.

3. The apparatus of claim 2 wherein the combing device is configured to separate the fibers.

4. The apparatus of claim 1, further comprising a device for washing the fibrous material.

5. The apparatus of claim 1, further comprising a device for drying the fibrous material.

6. The apparatus of claim 1, wherein the device for cleaning the fibrous material comprises a tumbler configured to rotate to tumble the fibrous material.

7. The apparatus of claim 1, wherein the fibers comprise hemp fibers.

8. An apparatus for processing fibers of fibrous material for use in formation of a biocomposite material, the apparatus comprising:
   a device for cleaning the fibrous material to separate fibers from other materials in the fibrous material, the device comprising a tumbler configured to rotate to tumble the fibrous material and a fan coupled to the tumbler; and
   a mechanism for pre-treating the fibers comprising a mechanical shearing device and a chemical separation device, wherein the mechanical shearing device is configured to shear the fibers to decorticate bast fibers of the fibers from core tissue fibers of the fibers.

9. The apparatus of claim 8, wherein the fibers comprise hemp fibers.

10. An apparatus for processing fibers of fibrous material for use in formation of a biocomposite material, the apparatus comprising:
    a device for cleaning the fibrous material to separate fibers from other materials in the fibrous material, the device comprising a tumbler configured to rotate to tumble the fibrous material and a fan coupled to the tumbler, wherein the fan is configured to direct an air flow through the tumbler to separate the fibers from the other materials in the fibrous material while the tumbler is rotating; and
    a mechanism for pre-treating the fibers comprising a mechanical shearing device and a chemical separation device, wherein the mechanical shearing device is configured to shear the fibers to decorticate bast fibers of the fibers from core tissue fibers of the fibers.

11. The apparatus of claim 10, wherein the fibers comprise hemp fibers.

12. An apparatus for processing fibers of fibrous material for use in formation of a biocomposite material, the apparatus comprising:
    a device for cleaning the fibrous material to separate fibers from other materials in the fibrous material, the device comprising a tumbler configured to rotate to tumble the fibrous material and a fan coupled to the tumbler, wherein the fan is configured to direct an air flow through the tumbler to separate the fibers from the other materials in the fibrous material while the tumbler is rotating for a period of time; and
    a mechanism for pre-treating the fibers comprising a mechanical shearing device and a chemical separation device, wherein the mechanical shearing device is configured to shear the fibers to decorticate bast fibers of the fibers from core tissue fibers of the fibers.

13. The apparatus of claim 12, wherein the fibers comprise hemp fibers.

14. An apparatus for processing fibers of fibrous material for use in formation of a biocomposite material, the apparatus comprising:
    a mechanism for cleaning the fibrous material to separate fibers from other materials in the fibrous material;
    a mechanical shearing device configured to shear the fibers to decorticate bast fibers of the fibers from core tissue fibers of the fibers;
    a device for combing the core tissue fibers;
    a device for pre-treating the core tissue fibers;
    a device for carding the core tissue fibers; and
    a device for shearing the core tissue fibers.

15. The apparatus of claim 14, wherein the mechanism for cleaning the fibrous material comprises a tumbler configured to rotate to tumble the fibrous material.

16. The apparatus of claim 14, wherein the fibers comprise hemp fibers.

* * * * *